Oct. 4, 1966  J. T. HERBERT  3,276,466
ROTARY HOT GAS VALVE
Filed May 18, 1962
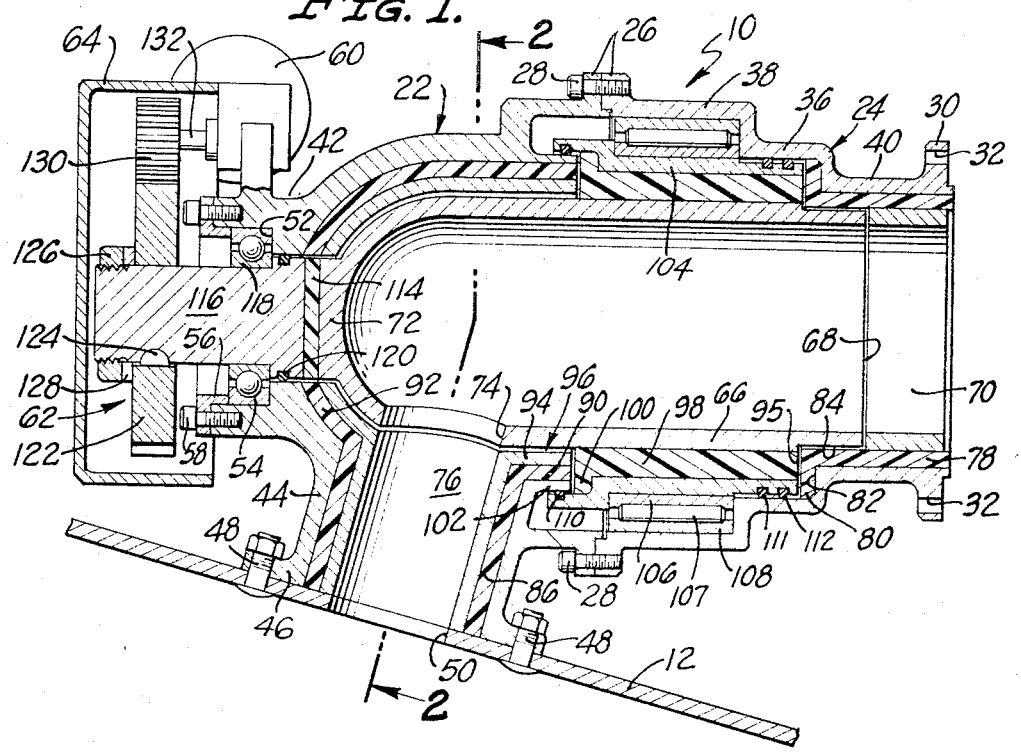
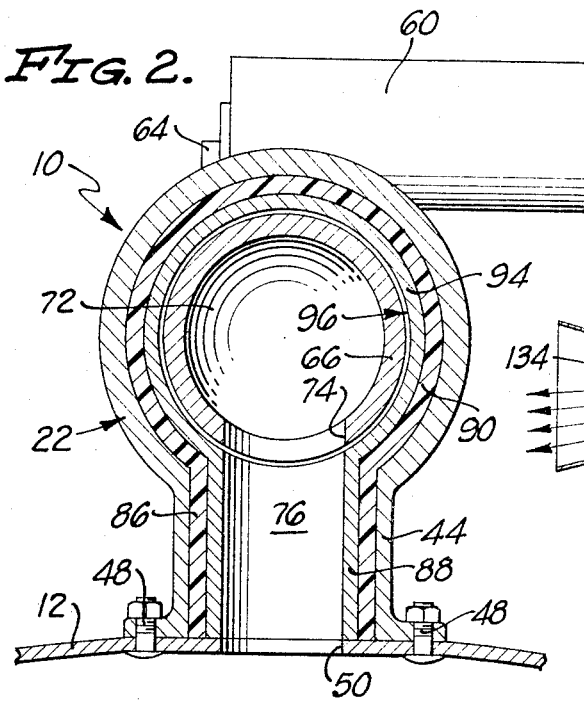
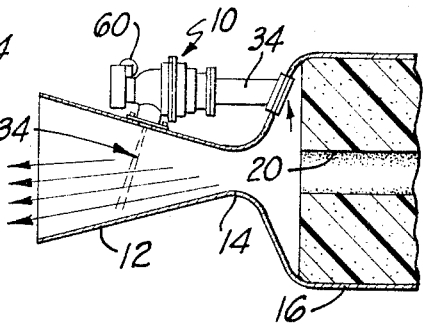
INVENTOR.
JOHN T. HERBERT
BY
Herbert E. Kidder
AGENT United States Patent Office 3,276,466
Patented Oct. 4, 1966

3,276,466
ROTARY HOT GAS VALVE
John T. Herbert, Redlands, Calif., assignor, by mesne assignments, to Lockheed Aircraft Corporation, Burbank, Calif., a corporation of California
Filed May 18, 1962, Ser. No. 195,803
2 Claims. (Cl. 137—339)

The present invention relates to fluid control valves, and more particularly to a rotary valve construction adapted for use in controlling the flow of exceedingly hot gases, such as the combustion gases of a solid propellant rocket motor, used for post nozzle injection thrust vector control.

Directional control of a rocket motor by deflection of the propulsive jet in an over-expanded nozzle, using a jet of high velocity gas injected inwardly from the nozzle wall, has been found to be both feasible and effective. The effectiveness-index of post nozzle injection thrust vector control is a function of the specific impulse of the injected stream. The main rocket exhaust stream in a present solid propellant rocket motor has this high specific impulse and is available for use as vector control injectant, but a major difficulty heretofore has been the construction of a valve that would withstand the rigors of the high temperature, metallic loaded exhaust, while modulating the flow of this stream. Heretofore, valves used for this purpose have been of the positive seating, on-off plug type valve, which is movable between fully open and closed positions. Such valves have proved troublesome in the past due to catastrophic erosion, and also to plugging up as a result of condensation of metallic substances in the exhaust stream on any part of the valve that becomes relatively cooled while shut down. Another objectionable feature of these prior valves is the lack of proportional flow control, which is essential for precise control of the thrust vector.

While the use of a lower temperature injection jet would eliminate most of the problems, this solution is entirely unacceptable because of the greatly reduced efficiency that results. Accordingly, there has long been a need for a reliable valve capable of modulating the flow of the highly erosive, metallic-loaded combustion gases of a solid propellant rocket, in the temperature range of 5000° to 6000° F., for post nozzle injection thrust vector control.

The primary object of the present invention is to provide a new and improved valve construction which is particularly effective for controlling the flow of exceedingly hot gas, as in the case of combustion gas of a solid propellant rocket motor injected into the exhaust stream for thrust vector control.

Another object of the invention is to provide a valve of the class described which is prevented from cooling during shut-off periods by an arrangement whereby a small controlled leakage of hot gas is directed about the exterior of an internal valve member to keep the same hot, whereby clogging of the valve unit by condensation of metallic oxides or other deposits from the by-pass exhaust stream is minimized or eliminated.

Still another object of the invention is to provide a hot gas valve of the class described, in which the movable valve member is rotatable, and is not movable linearly. Sliding parts have a tendency to gum up with aluminum oxide or other metallic deposits, whereas the rotary valve member of the present invention is easily sealed with O-rings. In this connection, advantage is gained by the use of an open-ended, tubular valve member longitudinally aligned with the inlet stream and having a rotationally exposable, non-axial outlet mouth located between a concentric tube-encircling ring of roller bearings and an annular thrust bearing mount at the rear end thereof. Such arrangement permits effective sealing of the bearing assemblies between the rotatable tube and a surrounding, fixed housing shell by use of compressible O-rings disposed adjacent the bearing mounts, but insulated from a directly-heated gas transmitting sleeve, or liner, which serves as the sole movable member of the valve.

These and other objects and advantages of the present invention will become apparent to those skilled in the art upon consideration of the following detailed description of the preferred embodiment thereof, reference being had to the accompanying drawings, wherein:

FIGURE 1 is a partially cut away side view of a hot gas valve embodying the principles of the invention;

FIGURE 2 is a transverse sectional view of the same taken at 2—2 in FIGURE 1; and FIGURE 3 is a fragmentary sectional view, taken through the aft end and nozzle of a rocket motor, showing the hot gas valve of my invention mounted on one side of the nozzle.

The valve of the present invention is designated in its entirety by the reference numeral 10, and as shown in FIGURE 3, the valve 10 is mounted on the outside of an expansion nozzle 12 which is connected by a restricted throat 14 to the interior of a rocket motor case 16 at the rear end thereof. The motor case 16 is loaded with a grain 18 of solid propellant having a central, longitudinally extending bore 20 provided therein which constitutes the burning surface. During the burning period, the hot combustion gases exhaust rearwardly at high velocity through the restricted throat 14 and expansion nozzle 12, thereby creating reaction thrust on the rocket motor. While there is only one valve 10 shown in FIGURE 3, it will be understood that for missile guidance purposes, there would be three, four or more such valves spaced equidistantly around the nozzle.

Each of the valves 10 includes an outer housing consisting of two generally tubular but otherwise dissimilar sections 22 and 24, that are aligned along a longitudinal axis 26 on their abutting ends and have radial flanges 26 on their abutting ends which are joined together by bolts 28. The forward section 24 (i.e., the right-hand section of FIGURE 1) is essentially a tube open at both ends, with a radial flange 30 on its front end which is apertured at 32 to receive bolts (not shown) that secure the valve to the flanged end of a tubular supply pipe 34 (FIGURE 3) that passes through the rear end wall of the motor case 16 and opens into the combustion chamber. In the direction of fluid flow (i.e., from right to left in FIGURE 1), the housing shell 24 is successively stepped outwardly, or peripherally enlarged at 36 and 38 from an initial circumference 40, so as to accommodate internally disposed structures, as will be described presently.

The aft housing section 22 is closed to fluid flow at its distal end, is necked down to a terminal portion 42 of reduced diameter, but remains essentially tubular in configuration, and is cast also with a laterally projecting tubular extension or outlet neck 44 angularly directed and terminating in a radial attachment flange 46. The latter is disposed somewhat slanted relative to the longitudinal axis of the valve 10, and is provided with a plurality of bolt holes to receive attachment bolts 48, which secure the valve to the rocket motor nozzle 12. An aperture 50 in the wall of the nozzle 12 provides open communication between the valve 10 and the interior of the nozzle, and the gas passing through the valve is thus discharged into the exhaust stream of the nozzle 12 in the form of a narrow, high velocity jet substantially perpendicular to the axis of the exhaust stream.

Internally, the constricted distal end 42 of the housing section 22 is formed with an annular shoulder 52 adapted to seat an axially centered ball-bearing raceway 54. The raceway 54 is secured in place by a clamping ring 56, which is, in turn, fastened to the terminal end of the housing section 22 by a circle of bolts 58.

Also mounted on the outer end of the aft housing section 22 is an actuator motor 60, having an integral reduction gear drive 62 enclosed within a gear housing 64, which is operatively connected with the inner liner 66 to drive the same. The actuator motor 60 may be either hydraulic or electric, and is preferably reversible in the direction of drive.

Rotatably mounted within the housing sections 22, 24 and coaxial therewith, is a generally cylindrical liner 66 of high temperature resistant material such as steel, ceramic or the like, having an open end 68, which abuts against a stationary ring 70 of the same material. The ring 70 is fixedly mounted within the valve section 24 immediately inside the entry end of the valve. At its other end, the liner 66 is closed by a dome-shaped end closure 72, and adjacent thereto is a lateral outlet 74, which is rotationally alignable with an exit passageway 76 that opens into the aperture 50.

A sleeve 78 of high-temperature insulating material, such as molded asbestos-phenolic plastic, is secured within the inlet end of the valve 10 between the aft housing section 24 and the ring 70 and end 68 of the liner 66. A radial flange 80 on the inner end of the sleeve 78 seats against an annular shoulder 82 on the inside of the housing section 24. The outer perimeter of the liner 66 is reduced slightly in diameter at 84 adjacent the open end 68, and this reduced-diameter portion 84 is rotatably seated on the sleeve 78.

Essentially, the rotatable liner 66 is completely surrounded by a capsule of insulating material within the outer housing sections 22, 24, except for that portion of its area which upon rotation closes the exit passageway 76. Concentrically located within the outlet neck 44 of the casing, is a tubular lining of heat insulating material 86, within which is mounted an inner tube 88 of the same heat resistant material as the valve liner 66. At its inner end, the tubular lining 86 turns radially outward and is shaped to conform to the inside surface of the housing 22, including a cylindrical portion 90 concentric with the main axis of the housing section 22 and a dome-shaped end 92 that lies against the dome-shaped inner end surface of the housing section.

The inner tube 88 also terminates at its inner end in a shell 94 that conforms to the inner surface of the heat-insulative lining 90, 92, and which also surrounds the inner end (i.e., the left-hand end in FIGURE 1) of the inner liner 66, 72. The shell 94 is spaced apart from the inner liner 66, 72 by a short distance so as to provide an encircling "leakage" chamber or gap 96 which is always in open communication both with the interior of the liner by way of the liner exit 74, and with the exit passageway 76. Thus, when the valve is closed, and the inner liner 66 is turned so that the liner exit 74 is angularly displaced from the passageway 76, hot gas within the inner liner continually escapes through the gap 96 and finally out through the exit passageway 76 in a relatively small flow that is insufficient to affect the exhaust stream in the rocket motor nozzle 12, yet sufficient to keep the inner liner 66 hot enough to prevent condensation of metallic oxides or other substances. In other words, by such controlled leakage of the hot gas being regulated by the valve 10, the farthest area of the valve liner is kept hot during any shut-off phase of the valve, thereby preventing troublesome plating out of metallic particles and the like from the combustion fluid stream onto the chilled surface of the liner.

The inner liner 66 is rotatably journalled within the housing sections 22 and 24 at two places along its length. Inwardly from the entrance insulation ring 78, the liner 66 is encircled by an insulating band 98, the right-hand end of which abuts the radial flange 80 on the sleeve 78. The opposite extremity of the band 98 is also flanged radially at 100, and this flange bears against and turns with respect to the juxtaposed ends of the inner shell 94, cylindrical portion 90 of the stationary insulation, and a flange 102 on the housing section 22.

A steel sleeve 104 surrounds the insulating band 98, and mounted on this sleeve is the inner race 106 of a needle bearing 107, the outer race 108 of which is pressed into the stepped portion 38 of housing section 24. The needle bearings 107 are effectively sealed from the hot gases passing through the valve by elastomeric O-rings 110, 111, and 112, seated within suitable circumferential grooves and preferably packed with a heavy silicone grease both for purposes of lubrication and fluid seal.

The closed or blind end 72 of the valve liner 66 is attached to a transverse insulating layer 114 which is, in effect, a continuation of the sheath 92. On the outside of the layer 114 there is fixedly secured a spindle 116, representing an axial extension of the tubular lining 66, which projects into the gear housing 64. An inner ball bearing raceway 118, companion to the outer raceway 54, is mounted on the spindle 116, and the ball bearing assembly is sealed off from the hot gases in the gap 96 by means of another elastomeric O-ring 120, which is also seated in a circumferential groove and packed with heavy silicone grease.

A relatively large gear 122 is mounted on the outer end of the spindle 116 and is secured against relative rotation by a key 124. The gear 122 is held on the spindle 116 by a nut 126 and washer 128. Meshing with the gear 122 is a pinion gear 130, mounted on a drive shaft 132 extending from the actuator motor 60. The gear train 62 thus constitutes reduction gearing by which the actuator motor applies an effective torque to the spindle 116 and connected valve liner 66, so as to progressively rotate the hollow valve 66 in either direction on its longitudinal axis, and thus correspondingly open or close the exit passageway 76 to whatever degree is desired.

The hot gas generated within the combustion chamber of the rocket motor by burning of the solid propellant 18, flows through the valve 10 and is discharged radially inwardly and at a rearward angle into the exhaust stream issuing from the nozzle 12, in the form of a high velocity jet 134 (FIGURE 3) which tends to deflect the exhaust stream toward the opposite side of the nozzle. The impingment of this jet or hot gas on the exhaust stream in the nozzle 12 deflects the thrust vector, and causes the rocket motor to change its direction of travel. The amount of such thrust vector deflection is a function of the volumetric flow of hot gas, and therefore precise control of the thrust vector is obtainable by rotating the inner liner 66 so that the exit passageway 76 is only partially cut off, which modulates the flow. With three or four injection valves 10 mounted around the nozzle 12 equidistant from one another, it is possible to obtain a high degree of accuracy in the directional control of the rocket motor during the burning period.

While I have shown and described in considerable detail what I believe to be the preferred embodiment of my invention, it will be understood by those skilled in the art that various changes may be made in the shape and arrangement of the several parts without departing from the broad scope of the invention as defined in the following claims.

I claim:

1. A hot gas valve of the character described, comprising; a closed housing having a fluid inlet and outlet means, and external attachment means adapted to couple the housing to a rocket motor in a by-pass line extending between the combustion chamber and the exhaust nozzle thereof in a position to convey hot combustion gases therebetween; a tubular liner of refractory material rotatably disposed within said housing on the longitudinal axis of said by-pass line, said liner having a generally axial, normally-open inlet end aligned with said fluid inlet of the housing and with said by-pass line, and having a non-axial outlet opening selectively alignable with said housing outlet by rotation of the liner; a surround insulating sheath fixed disposed about said liner within said housing; bearing means rotatably supporting said liner adjacent the inlet end thereof; rotary sealing means for said bearing means comprising O-rings spaced apart longitudinally on opposite sides of said bearing means; means defining a narrow chamber surrounding said liner beyond said insulating sheath and in open communication at all times with the respective fluid outlets of both said housing and said liner; whereby there is a constant leakage of hot gas through said chamber when the valve is closed; an axial spindle fixed to and projecting from the end of said liner remote from said inlet end, said spindle being separated from said liner by an insulating layer; an annular thrust bearing mounted on said spindle; and operative gear and drive means adapted progressively to align and disalign with the respective liner and housing outlets by point rotation of said spindle and connected liner.

2. A hot gas valve of the character described, comprising in combination, a housing having fluid inlet and outlet means adapted to be connected into a supply line carrying hot gas, a tubular linear of refractory material disposed within said housing on a longitudinal axis relative to said supply line, and having a generally axial, normally-open inlet aligned with said fluid inlet and a non-axial outlet opening selectively alignable with said housing outlet by relative rotation of the liner with respect to said housing, a surrounding insulating sheath disposed about said liner within said housing, motor operated means adapted progressively to align and disalign the respective outlets of the liner and housing by relative rotation therebetween, said tubular liner being supported on opposite sides of said outlet opening by bearing means, and means sealing said bearing means from the hot gases flowing in said chamber, and a wall of refractory material within said housing and generally surrounding at least the outlet end of said liner, said wall being spaced a small distance outwardly from said liner to define an encompassing fluid chamber in open communication at all times with the respective fluid outlets of both the housing and liner, whereby a continuous leakage flow of a small amount of hot gas through said chamber prevents said liner from appreciably cooling below the hot gas temperature in said supply line.

References Cited by the Examiner

UNITED STATES PATENTS

| | | | |
|---|---|---|---|
| 1,405,099 | 1/1922 | Cooke | 251—310 |
| 1,539,816 | 5/1925 | Whiteman | 251—310 |
| 2,100,154 | 11/1937 | Ashton | 251—133 |
| 2,352,799 | 7/1944 | Newton | 137—375 |
| 2,631,002 | 3/1953 | Mueller | 251—310 |
| 2,851,648 | 9/1958 | Reger | 251—134 |
| 2,914,916 | 12/1959 | Gelin | 60—35.54 |
| 3,016,699 | 6/1962 | Bertin | 60—35.54 |
| 3,045,692 | 7/1962 | Reynolds | 137—240 |

FOREIGN PATENTS 619,563   of 1949   Great Britain.

WILLIAM F. O'DEA, *Primary Examiner.*

ISADOR WEIL, *Examiner.*

R. GERARD, *Assistant Examiner.*